United States Patent [19]

Nakadozono

[11] Patent Number: 5,121,112

[45] Date of Patent: Jun. 9, 1992

[54] DISPLAY APPARATUS FOR VEHICLE

[75] Inventor: Hiroshi Nakadozono, Kanagawa, Japan

[73] Assignee: Nissan Motor Company, Ltd., Yokohama, Japan

[21] Appl. No.: 456,695

[22] Filed: Dec. 26, 1989

[30] Foreign Application Priority Data

Dec. 29, 1988 [JP] Japan ............... 63-331747

[51] Int. Cl.⁵ ............... B60L 3/12; B60Q 11/00; G09G 3/00; G03B 21/00
[52] U.S. Cl. ............... 340/870.160; 340/459; 340/715; 307/10.1
[58] Field of Search ............... 340/715, 870.16, 459; 307/10.1

[56] References Cited

U.S. PATENT DOCUMENTS

| | | | |
|---|---|---|---|
| 3,651,454 | 3/1972 | Venema et al. | 340/870.16 |
| 4,184,146 | 1/1980 | Fratzke et al. | 340/459 |
| 4,196,413 | 4/1980 | Sowa | 340/715 |
| 4,344,136 | 8/1982 | Panik | 340/459 |
| 4,667,176 | 5/1987 | Matsuda | 340/459 |
| 4,667,429 | 6/1987 | Glotzbach | 340/459 |
| 4,817,040 | 3/1989 | Bodley-Scott | 340/459 |
| 4,855,709 | 8/1989 | Noderi | 340/459 |

Primary Examiner—Donald J. Yusko
Assistant Examiner—Brian Zimmerman

[57] ABSTRACT

A display system for a vehicle includes a plurality of sensors, a priority determining module, a display control module, and display unit having two display segments. The sensors detect various vehicular conditions to provide signals to the priority determining module. Each signal is assigned a degree of priority of high or low level. On input of signals to the priority determining module, determination is made as to whether the received signals are high or low level. If the received signal is high level, information indicated by the received signal is displayed on both segments of the display unit, while if it is low level, indications on one of the display segments is interrupted and information indicated by the received low level signal is display on the interrupted display segment.

10 Claims, 6 Drawing Sheets

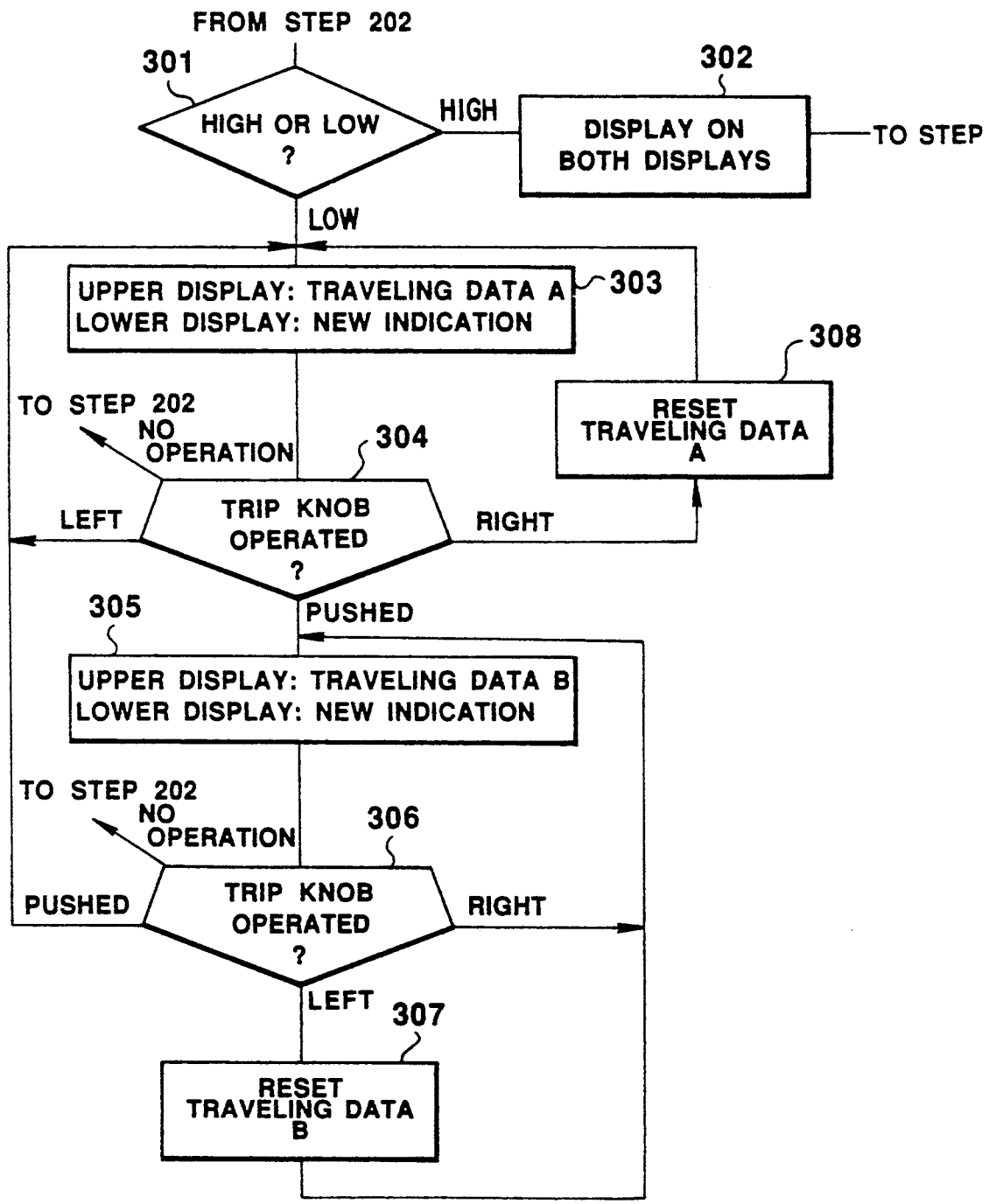

DISPLAY APPARATUS FOR VEHICLE

BACKGROUND OF THE INVENTION

1. Technical Field

The present invention relates generally to a display apparatus for indicating traveling data together with other vehicular information such as a door open indicator for example.

2. Background Art

Such a display unit is well known in the art. A conventional display unit includes generally a first display for providing an image indicative of primary vehicular information, a second display for providing another image indicative of secondary vehicular information, and a plurality of displays for providing images indicative of the open or closed condition of doors for example, and/or for indicating a short in a headlamp circuit, etc. This type of display conventionally has the disadvantage of a bulky screen and high cost. Also, this display indicates all information derived from sensors uniformly and thus it is difficult for a driver to identify degree of importance of displayed information immediately.

SUMMARY OF THE INVENTION

It is accordingly an object of the present invention to provide a display apparatus which has a compact screen for displaying all necessary information and enables a viewer to understand the degree of importance of same.

According to one aspect of the present invention, there is provided a display apparatus for a vehicle which comprises a detecting means for detecting trip information to provide a first signal indicative thereof, a monitoring means for monitoring vehicular conditions to detect a predetermined alarm condition to provide a second signal indicative thereof, a display means for displaying the trip information in a first display mode according to the first signal and the alarm condition in a second display mode according to the second signal, and a controlling means for automatically changing from the first display mode to the second display mode in response to the second signal.

According to another aspect of the invention, there is provided a display apparatus for a vehicle which comprises a detecting means for detecting first and second trip information to provide signals indicative thereof, a monitoring means for monitoring vehicular conditions to detect a first alarm condition to provide a first signal indicative thereof and a second alarm condition to provide a second signal indicative thereof, the first signal having higher display priority than that of the second signal, a display means, including a first display and a second display, for displaying the first and the second trip information in a first display mode, the first alarm condition in a second display mode, and the second alarm condition in a third display mode, and a controlling means for controlling the display means to select between the first, second, and third display modes, the first display mode being such that the first and the second trip information are displayed on the first and the second display in response to the signals from first detecting means, the second display mode being such that the first and second display are interrupted to provide the first alarm condition in response to the first signal, the third display mode being such that only the first display is interrupted to provide the second alarm condition in response to the second signal.

In the preferred mode, the first and the second trip information each indicate a trip distance from the last resetting of a trip meter. The trip meter may include first, second, and third operation modes, the first operation mode resetting the first trip information, the second operation mode resetting the second trip information, the third operation mode is such that when detected vehicular information is displayed on the first display, this information is changed to display on the second display and the first trip information is displayed on the first display again.

The monitoring means may include a plurality of sensors each of which is adapted for sensing vehicular alarm information, each sensor being pre-assigned high priority or low priority to respectively provide a first signal having a high level or a second signal having a low level.

The controlling means may control the display means to display detected vehicular alarm condition information in sequence at given intervals when the plurality of sensors output first or second signals simultaneously.

The determining means may be operable to determine malfunction of actuators associated with an automatic transmission based on a pulse train, which has a predetermined duty factor corresponding to each actuator, output from an automatic transmission controller, the controlling means interrupting the first and the second displays in the event of actuator malfunction to display a predetermined number assigned to the malfunctioning actuator(s), all actuators having respective predetermined numbers assigned thereto.

BRIEF DESCRIPTION OF THE DRAWINGS

FIGS. 3(a), 3(b), and 3(c) are flowcharts which show a program and sequence performed by a display system according to the invention.

DESCRIPTION OF THE PREFERRED EMBODIMENT

Figure 1:
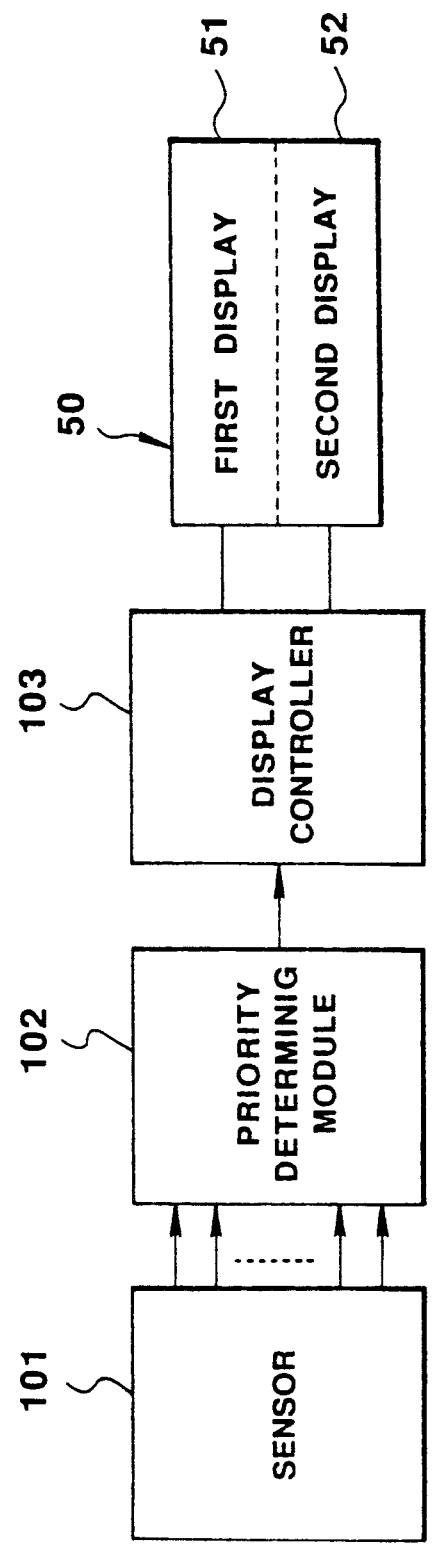
FIG. 1 is a schematic block diagram which shows a display system according to the present invention.

Referring now to the drawings, particularly to FIG. 1, a display system according to the present invention is shown. This system includes generally a sensor 101, a priority determining module 102, a display control module 103, and a display unit 50. The sensor 101 senses various vehicular information to provide signals indicative thereof to the priority determining module 102. The module 102 is adapted for determining degree of priority, to a driver, of the received information. The display control module 103 controls operation of the display unit 50 which integrally forms a first display 51 and a second display 52.

In operation, the sensor senses vehicular information continuously to output signals to the priority determining module 102. When the module 102 considers the information input from the sensor as higher priority information, it interrupts traveling data indications on both displays 51 and 52 and supplies the higher priority information to the displays. Alternatively, when the module 102 considers information from the sensor as lower priority information, it interrupts supply of traveling data to either of the displays 51 and 52 and then provides the lower priority information to the interrupted display. Therefore, this system always provides necessary vehicular information to a driver.

Figure 2:
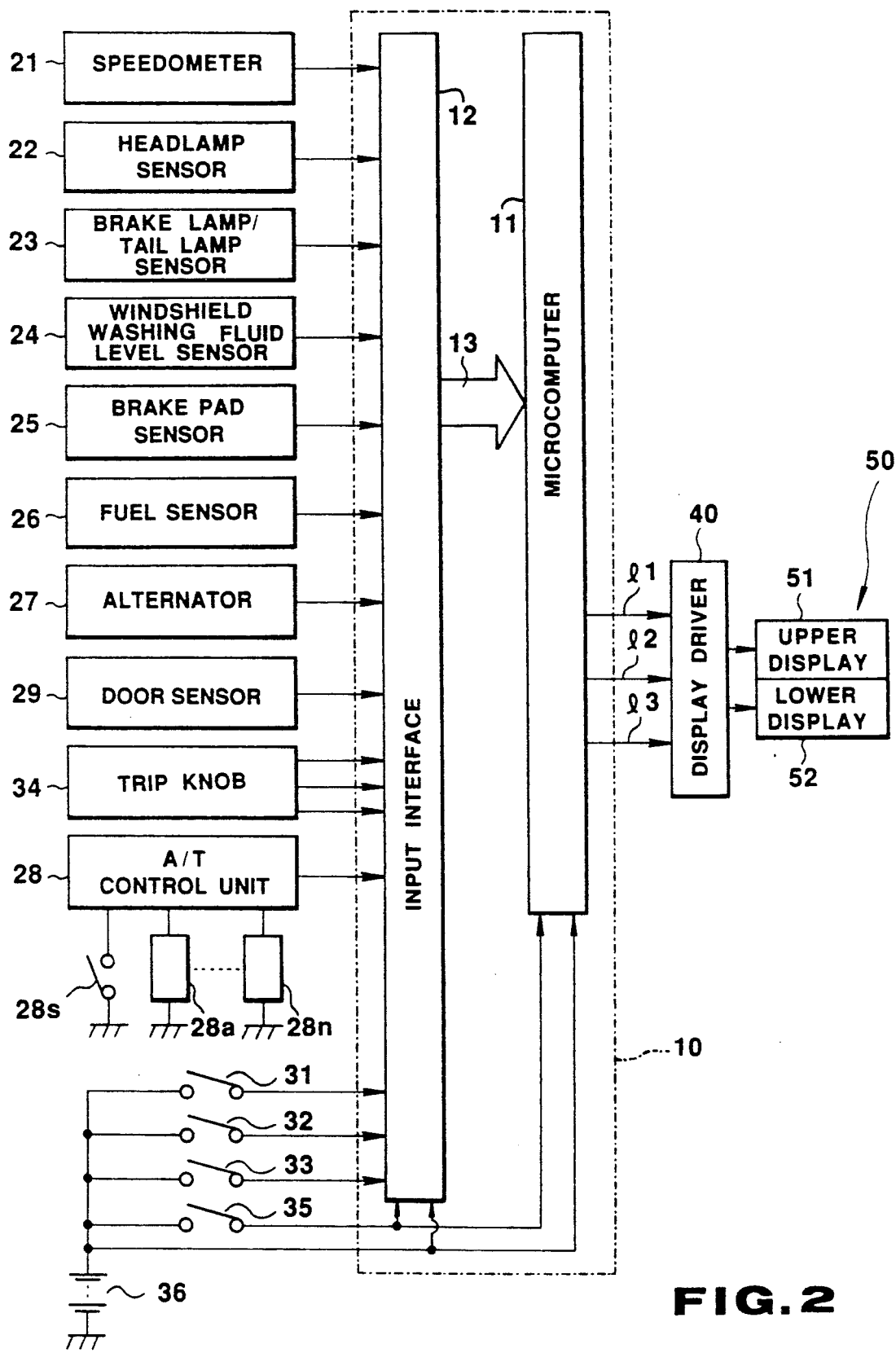
FIG. 2 is a block diagram which shows an embodiment of a display system according to the present invention.

Referring to FIGS. 2 and 3, a display system of the invention is shown in detail. This system includes generally a plurality of sensors, a control circuit 10, a display driver 40, and a display unit 50. A speedometer 21 detects vehicular speed to provide a pulse signal indicative thereof. A headlamp sensor 22 detects broken wires, or other malfunctions to provide a signal indicative thereof. A brake lamp/tail lamp sensor 23 detects broken wires, or other malfunctions in the brake lamps and/or tail lamps to provide a signal indicative thereof. A windshield washer sensor 24 detects a residual volume of window fluid to provide a signal indicative thereof. A brake pad sensor 25 senses wear of a brake pad and provides a signal when the wear reaches a given level. A fuel sensor 26 provides a signal indicative of a residual volume of fuel. An alternator 27 generates charging power and provides a voltage corresponding to the charging power. A door switch 29 is turned off when any door is opened and provides a signal indicative thereof.

The control circuit 10 is provided with a microcomputer 11 which includes a CPU, a RAM, a ROM and an input interface 12 which is connected to the microcomputer 11 through a bus line 13. As can be seen in the figure, the input interface 12 is also connected to the above mentioned sensors or so forth to receive signals output therefrom.

The display system may further include an automatic transmission control unit (A/T control unit) 28 which is connected to the input interface 12. This unit 28 is well known in the art as a controller which automatically controls gear ratio of an automatic transmission according to driving conditions. A plurality of actuators 28a to 28n for controlling the automatic transmission and a self-diagnosable starting switch 28s are connected to the A/T control unit 28. The control unit 28 always monitors the operating condition of the actuators 28a to 28n and outputs a signal indicative of malfunction in the automatic transmission to the input interface 12 if the starting switch 28s becomes off (the A/T control unit may provide a high or low level signal). On the other hand, when the starting switch is on, the control unit 28 outputs a pulse train by a predetermined duty factor according to the status of the actuators. The duty factor of a pulse train corresponding to an unoperated actuator is different from that of an actuator in service, thereby allowing the control circuit 10 to immediately determine whether the actuators are operable or not.

The display system further includes a brake lamp switch 31, a headlamp switch 32, a light switch 33, and a trip knob 34, all of which are connected to the input interface 12. The brake lamp switch 31 is turned on by depression of a brake pedal, causing brake lamps to be switched on. The headlamp switch 32 is for turning the headlamps on and off. The light switch 33 turns parking lights or such on and off. The trip knob 34 serves to reset a trip meter and has three switching modes as will be described hereinafter in detail. Briefly, a first switching mode is provided by rotational operation in a clockwise direction, a second switching mode is provided by rotational operation in a counterclockwise direction, and a third switching mode is provided by pushing operation. The trip knob outputs a signal to the input interface 12 in each operation mode. The input interface 12 and the microcomputer 11 communicate via an ignition switch 35 or communicate with each other directly.

Connected to an output port of the microcomputer 11 is a display driver 40 through signal lines 1 to 3, which drives the display unit 50. The signal line 1 supplies traveling data to a traveling display A. The signal line 2 supplies traveling data to a traveling display B. The signal line 3 has a plurality of lines which transmit information indicative of detected conditions as code signals. The traveling data is calculated in the microcomputer 11 based on pulse signals output from the speedometer 21.

The display unit is provided with an upper display 51 and a lower display 52, each of which may be formed with thirteen 6×7 dot matrix elements in parallel lines. Usually, the upper display 51 indicates A traveling data and the lower display 52 indicates B traveling data.

Additionally, in the case of code information of high priority detected data, as mentioned hereinafter, both displays 51 and 52 serve to display it simultaneously. A code signal of lower priority detected data is displayed on either display 51 or 52.

Referring to FIG. 3, a flow chart is shown which represents a program, or sequence of logical steps, performed by the control circuit 10.

Figure 4A:
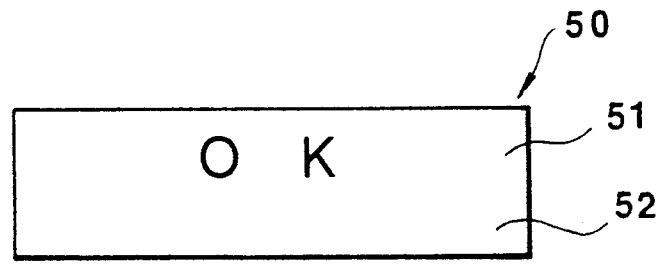
FIGS. 4(a)-4(e) are views which show examples of indications on a display.
Figure 4B:
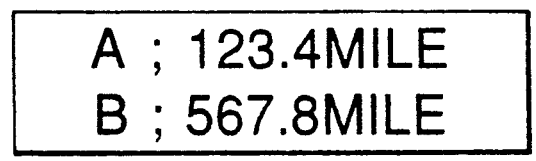

After the turning on of an ignition switch at step 200, the routine proceeds to a decision step 201 in which it is determined if the trip knob 34 has been rotated in the clockwise or counterclockwise direction or has been depressed. If the knob 34 is not operated or pushed, the routine proceeds to a step 202 in which it is determined whether signals detected by the above described sensors are input or not. If a NO answer is obtained, the routine goes to step 203 in which a character "OK", as shown in FIG. 4(a), is displayed on the upper display 51. Subsequently, the routine proceeds to step 204 in which traveling data A and B, as shown in FIG. 4(b), are displayed on both displays 51 and 52 and then the routine goes to a step 205. In step 205, the same determination of the operational mode of the trip knob is made as in step 201. If the knob is not operated, the routine returns to step 202, if it has been rotated in the counterclockwise direction, the traveling data B is reset in step 206, and if it has been rotated in the clockwise direction, the traveling data A is reset in step 208. Traveling data A and B indicate a travel distance after resetting. If the trip knob has been depressed, the routine proceeds to step 207 in which traveling data indication varies between "km" and "miles". Subsequently, the routine proceeds to step 209 and returns to step 202.

In step 201, if any output signals from the sensors are present and a YES answer is obtained, the routine proceeds to step 301, as shown in FIG. 3(b), in which the priority, or degree of importance of vehicular conditions detected by the sensors is determined. This determination is performed such that degrees of priority, that is, high or low levels are pre-assigned to each sensor. In this embodiment, a low level is assigned to indications of residual fuel volume and residual washing fluid volume, while a high level is assigned to indications provided by other sensors. If high priority data is obtained in step 301, the routine proceeds to step 302 in which both A and B traveling data are deleted and indication of detected condition is provided on both upper and lower displays 51 and 52. For example, if the output voltage from the alternator 27 is low level, characters, as shown in FIG. 4(c), are displayed.

Figure 4C:
Figure 4D:
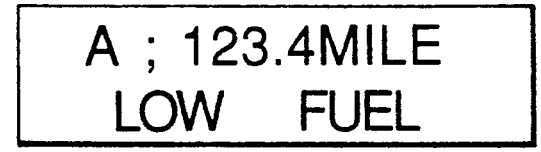

If an answer of low level is obtained, the routine proceeds to step 303 in which indication of A traveling data on the upper display 51 is held and indication of the condition detected by the sensor is displayed on the lower display 52. By way of example, when a volume of residual fuel is little, characters, as shown in FIG. 4(d), are displayed.

Subsequently, the routine proceeds to step 304 in which the same determination about the trip knob operation is made as in step 201. If the knob has not been operated, the routine then returns to step 202. If the knob has been rotated in the counterclockwise direction, the routine returns to step 303, while if rotated in the clockwise direction, the routine proceeds to step 308 in which the traveling data A is reset and the routine then returns to step 303. At this time, an indication of the upper display 51 for traveling data A is the character "0". In step 304, if the knob has been depressed, the routine proceeds to step 305 in which the traveling data B is displayed on the upper display 51 and an indication of information about conditions detected by the sensor is provided on the lower display 52. The routine then proceeds to step 306 in which the same determination about the operational mode of the knob as in step 201 is made again. If the knob has not been operated, the routine proceeds back to step 202. If it has been rotated in the clockwise direction, the routine returns to step 305, while if rotated in the counterclockwise direction, the routine proceeds to step 307 in which an indication, on the upper display 51, about the traveling data B is reset to display a character "0" and the routine returns to step 305. If the knob is depressed, the routine returns to step 303.

Figure 3A:
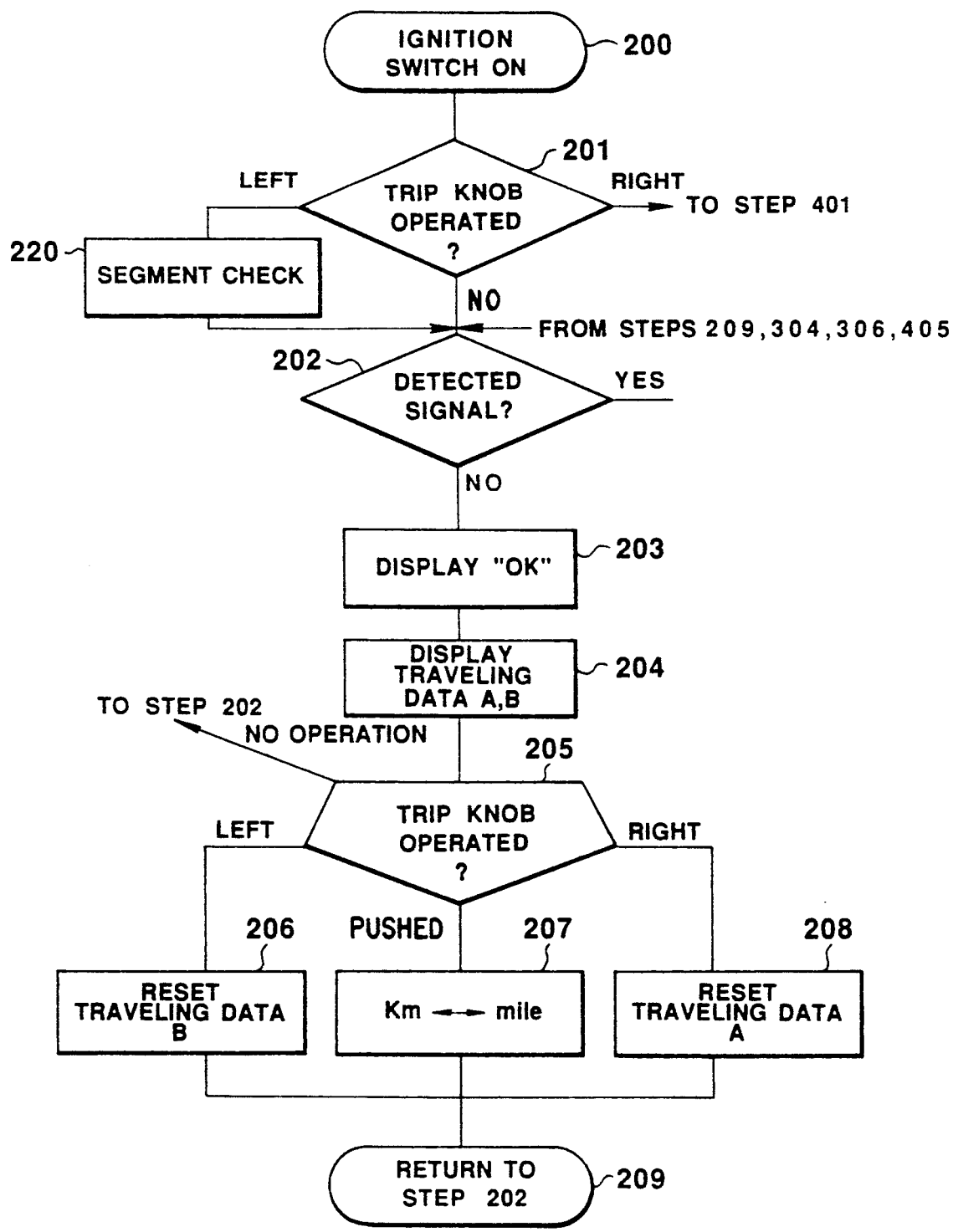

Back to FIG. 3(a) again, in step 201, if the trip knob has been rotated in the counterclockwise direction, the routine proceeds to step 220 in which each segment of the display unit 50 is checked and then the routine goes to step 202.

When a plurality of predetermined conditions are detected by the sensors, each code information indicative thereof is displayed on the display unit 50 in sequence at a given interval in the same way as describe above.

Figure 3C:
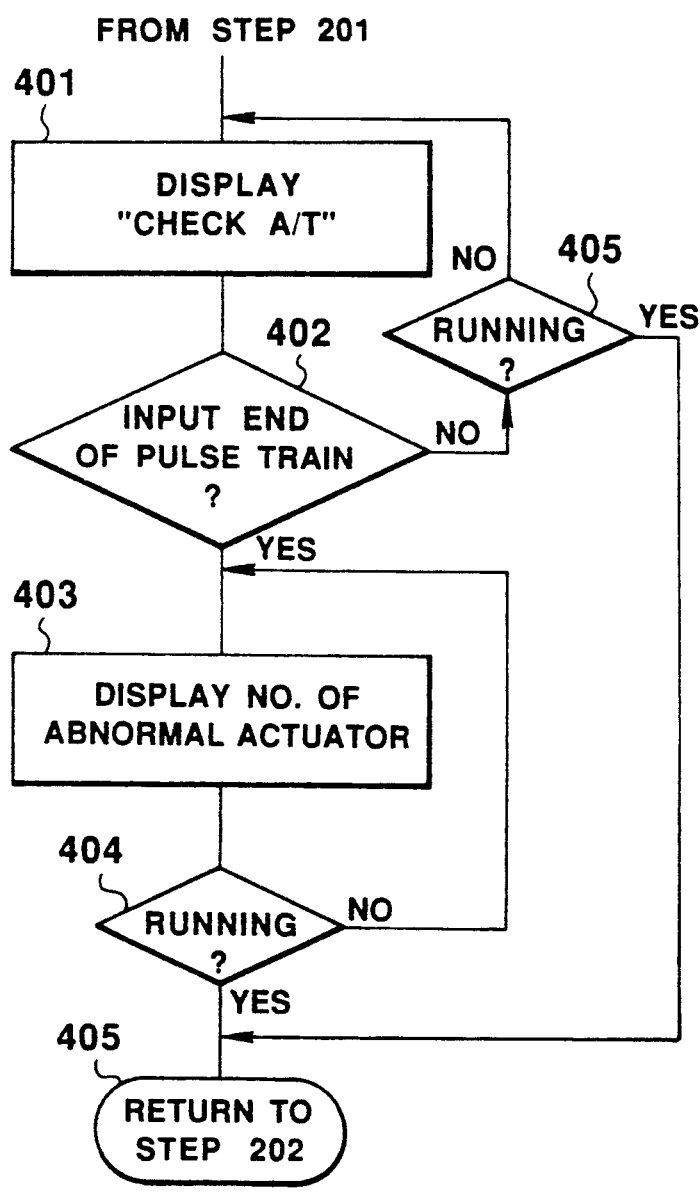
Figure 4E:
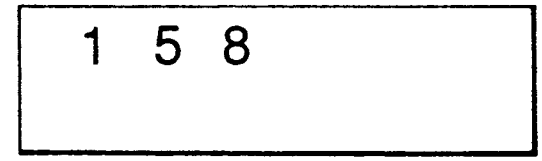

In step 202, if the starting switch 28s of the automatic transmission control unit 28 is turned on and the ignition switch is turned on with the trip knob rotated in the clockwise direction, the routine proceeds to step 401 as shown in FIG. 3(c). In step 401, the characters "CHECK A/T" are displayed on the display unit 50 and the routine proceeds to step 402 in which it is determined whether a pulse train input from the A/T control unit 28 to the input interface 12 indicates all actuators functioning or not. If not, the routine proceeds to step 405 in which determination is made as to whether the vehicle is running or not. If a YES answer is obtained, the routine proceeds to step 405 and then returns to step 202, if a NO answer is obtained, the routine proceeds to step 401. In step 402, if a YES answer is obtained, the routine proceeds to step 403 in which malfunction of each actuator is determined based on a duty factor of the pulse train output from the A/T control unit 28 and an abnormal actuator is represented on the display unit 50 with a pre-assigned number. For example, assigned numbers "1", "5", and "8" corresponding to respective malfunctioning actuators are displayed as shown in FIG. 4(e).

Therefore, compared with conventional detection systems where an alarm lamp blinks on and off according to a duty factor of pulse train output from an automatic transmission control unit 28 to generally identify a malfunction without indicating which actuator is the cause. With the display system of the invention it is possible to self-diagnose the automatic transmission control unit easily.

According to the program and sequence as shown in FIG. 3, detected information which would tend to impinge upon vehicle running efficiency, such as an alternator malfunction or an open door is displayed on both displays 51 and 52 by interrupting indication of traveling data A and B. In the case of detected information, such as residual fuel volume, which does not impinge upon vehicle running efficiency for the present, the indication of traveling data on one of the displays, either 51 or 52, is interrupted and the detected information is displayed on the interrupted display. It is therefore appreciated that high priority information about vehicular condition is displayed on a big display including both upper and the lower displays 51 and 52 to report high priority data to a driver emphatically, the driver thereby understands the indication as high priority information, or important information. Further, much vehicular information can be displayed on a relatively small display area.

The gist of the present invention is that high priority information about various vehicle conditions is displayed over a pair of displays, while lower priority information is displayed on either two displays. As the degrees of priority assigned to various detected conditions may differ according to design philosophy, the groupings thereof may be made in various suitable ways. Additionally, the kind of information detected is not limited to those of the above mentioned embodiment. While the display unit includes a pair of displays only, it may further include additional displays.

Further, if trip information representative of trip distance is displayed on only one display and vehicular information is received from more than one sensor with the same priority, the information from the sensors may be serially indicated on the display in the order received by automatic interruption of currently displayed trip information.

What is claimed is:

1. A display apparatus for a vehicle comprising:
   detecting means for detecting and providing signals indicative of first and second trip information;
   monitoring means, including a plurality of sensors each of which is adapted for sensing a different vehicular alarm condition, each sensor being preassigned high priority or low priority to respectfully provide a first signal having a high level or a second signal having a low level, for monitoring vehicular conditions to detect said first signal indicative of a first alarm condition and said second signal indicative of a second alarm condition,;
   display means comprising a first display and a second display for displaying said first and said second trip information in a first display mode, said first alarm condition in a second display mode, and said second alarm condition in a third display mode; and
   controlling means for controlling said display means to select between said first, second, and third display modes, wherein said first display mode displays said first and said second trip information on said first and said second displays in response to the signals from said detecting means, said second display mode interrupts said first and second trip information on said first and second displays and displays said first alarm condition on said first and second displays in response to said first signal from one of said sensors which have been assigned high-priority, said third display mode interrupts only said first trip information on said first display and displays said second alarm condition in response to said second signal from one of said sensors which have been assigned low-priority on said first display.

2. A display apparatus as set forth in claim 1, wherein said detecting means comprises a trip meter, said first and said second trip information each indicating a trip distance from a last resetting of said trip meter.

3. A display apparatus as set forth in claim 2, wherein said trip meter includes first, second, and third operation modes, said first operation mode resetting said first trip information, said second operation mode resetting said second trip information, and said third operation mode changing the display of the detected alarm condition on said first display to said second display so that said first trip information is displayed on said first display again.

4. A display apparatus as set forth in claim 1, wherein said controlling means controls said display means to display detected alarm condition information in sequence at given intervals when said plurality of sensors output first or second signals simultaneously.

5. A display apparatus as set forth in claim 1, wherein said monitoring means is operable to determine malfunction of actuators associated with an automatic transmission based on a pulse train, which has a predetermined duty factor corresponding to each actuator, output from an automatic transmission controller, said controlling means interrupting said first and said second displays in the event of actuator malfunction to display a predetermined number assigned to the malfunctioning actuator(s), all actuators having respective predetermined numbers assigned thereto.

6. A display apparatus for a vehicle comprising:
first monitoring means for monitoring and providing signals indicative of first and second trip data;
second monitoring means, including a plurality of sensors each of which is adapted for sensing a different vehicular alarm condition, each sensor being pre-assigned high priority or low priority to respectfully provide a first alarm signal having a high level or a second alarm signal having a low level, for monitoring vehicular information to detect said first alarm signal indicative of first alarm condition and to detect said second alarm signal indicative of second alarm condition; and
a display unit having first and second display sections and control means for controlling the display of said first and said second display sections,
wherein said display unit being responsive to the signal from said first monitoring means to provide the first and the second trip data on the first and the second display sections respectively, said display unit being responsive to the second alarm signal from one of said sensors which have been assigned low-priority to interrupt the first trip data displayed on the first display section and displaying the first alarm data thereon without interrupting the second trip data displayed on the second display section, and being responsive to the first alarm signal from one of said sensors which have been assigned low-priority to interrupt the first and second trip data displayed on the first and the second display sections and displaying the second alarm data on the first and the second display sections.

7. A display apparatus as set forth in claim 6, wherein said first monitoring means comprises a trip meter, said first and said second trip data each indicating a trip distance from a last resetting of said trip meter.

8. A display apparatus as set forth in claim 7, wherein said trip meter includes first, second, and third operation modes, said first operation mode resetting said first trip data, said second operation mode resetting said second trip data, and said third operation mode changing the display of the detected alarm condition on said first display section to said second display section for displaying said first trip data on said first display.

9. A display apparatus as set forth in claim 6, wherein said control means controls said first and said second display sections to display the detected alarm condition in sequence at given intervals when said plurality of sensors outputs said vehicular alarm condition signals simultaneously.

10. A display apparatus as set forth in claim 6, wherein said second monitoring means is operable to determine malfunction of actuators associated with an automatic transmission based on a pulse train, which has a predetermined duty factor corresponding to each actuator, which is output from an automatic transmission controller, wherein a predetermined identity number is assigned to each actuator, said control means interrupting said first and said second display sections in the event of actuator malfunctioning and displaying the predetermined identity number of all malfunctioning actuators.

* * * * *

UNITED STATES PATENT AND TRADEMARK OFFICE
CERTIFICATE OF CORRECTION

PATENT NO. : 5,121,112

DATED : June 9, 1992

INVENTOR(S) : Hiroshi NAKADOZONO

It is certified that errors appear in the above-identified patent and that said Letters Patent is hereby corrected as shown below:

In the claims, Cols. 6 and 7:

Claim 1, lines 51 and 52, replace "respectfully" with --respectively--;
Claim 1, line 56, delete ",";
Claim 6, lines 49 and 50, replace "respectfully" --respectively--;
Claim 6, line 18, replace "low-priority" with --high-priority--.

Signed and Sealed this

Thirty-first Day of August, 1993

Attest:

BRUCE LEHMAN

*Attesting Officer*   *Commissioner of Patents and Trademarks*